(12) United States Patent
Von Ruff (10) Patent No.: US 12,366,205 B1
(45) Date of Patent: Jul. 22, 2025

(54) SYSTEM AND METHOD FOR GENERATING ELECTRICITY AND HEAT FROM THE COMBUSTION OF TAIL GAS CONTAINING BIOGENIC METHANE USING A GAS TURBINE

(71) Applicant: WM Intellectual Property Holdings, L.L.C., Houston, TX (US)

(72) Inventor: Lucas Von Ruff, Houston, TX (US)

(73) Assignee: WM Intellectual Property Holdings, L.L.C., Houston, TX (US)

( * ) Notice: Subject to any disclaimer, the term of this patent is extended or adjusted under 35 U.S.C. 154(b) by 0 days.

(21) Appl. No.: 19/035,668

(22) Filed: Jan. 23, 2025

Related U.S. Application Data (60) Provisional application No. 63/624,559, filed on Jan. 24, 2024.

(51) Int. Cl.
| | |
|---|---|
| *F02C 7/22* | (2006.01) |
| *F02C 3/14* | (2006.01) |
| *F02C 3/20* | (2006.01) |
| *F02C 3/22* | (2006.01) |
| *F02C 7/10* | (2006.01) |
| *F02C 7/14* | (2006.01) |

(Continued)

(52) U.S. Cl.
CPC ............. *F02C 7/22* (2013.01); *F02C 3/14* (2013.01); *F02C 3/20* (2013.01); *F02C 3/22* (2013.01); *F02C 7/10* (2013.01); *F02C 7/14* (2013.01); *F02C 7/224* (2013.01); *F23R 3/005* (2013.01); *F23R 2900/03341* (2013.01)

(58) Field of Classification Search
CPC ...... F02C 7/10; F02C 7/14; F02C 7/22; F02C 7/224; F02C 3/14; F02C 3/20; F02C 3/22; F23R 3/005; F23R 2900/03341
See application file for complete search history.

(56) References Cited

U.S. PATENT DOCUMENTS

| | | | | | |
|---|---|---|---|---|---|
| 3,175,361 | A | * | 3/1965 | Schirmer | ................ F23R 3/005 60/761 |
| 4,896,499 | A | * | 1/1990 | Rice | ........................ F02C 6/003 60/39.182 |

(Continued)

FOREIGN PATENT DOCUMENTS

| | | |
|---|---|---|
| KR | 100411936 B1 | 12/2003 |
| WO | 2012/131414 | 10/2012 |

*Primary Examiner* — William H Rodriguez
(74) *Attorney, Agent, or Firm* — Greenberg Traurig LLP (57) ABSTRACT

A system and method for generating electricity and heat from the combustion of tail gas containing biogenic methane using a gas turbine are provided. A gas turbine can generate electricity and heat from process tail gases (comprising biomethane, but also comprising fixed gases such as carbon dioxide, nitrogen, oxygen, hydrogen, carbon monoxide, as well as trace gases) as a secondary fuel while using natural gas as the primary fuel in the gas turbine. The tail gases from biogenic methane purification processes can have heating values as low as 42 BTU/SCF. The gas turbine will reduce net energy consumption, reduce greenhouse gas emissions, and reduce operating costs for biogenic methane purification processes. The gas turbine can also destroy tail gases that would otherwise cause excessive air emissions without the use of pollution control equipment (such as a thermal oxidizer or flare).

19 Claims, 4 Drawing Sheets

(51) Int. Cl.
  *F02C 7/224*  (2006.01)
  *F23R 3/00*  (2006.01)

(56) References Cited

U.S. PATENT DOCUMENTS

| | | | | |
|---|---|---|---|---|
| 5,737,922 | A * | 4/1998 | Schoenman | F23R 3/005 |
| | | | | 415/115 |
| 9,217,116 | B2 | 12/2015 | Huang | |
| 10,487,282 | B2 | 11/2019 | Foody et al. | |
| 2002/0148213 | A1* | 10/2002 | Yu | F02C 3/365 |
| | | | | 60/39.17 |
| 2009/0193812 | A1* | 8/2009 | Kirzhner | F01K 23/101 |
| | | | | 60/39.15 |
| 2009/0223229 | A1 | 9/2009 | Wang et al. | |
| 2009/0249685 | A1 | 10/2009 | Flowers et al. | |
| 2012/0036863 | A1* | 2/2012 | Kirzhner | F02C 7/22 |
| | | | | 60/776 |
| 2012/0151935 | A1* | 6/2012 | Bunker | F02K 3/11 |
| | | | | 60/774 |
| 2015/0167554 | A1* | 6/2015 | Cho | F02C 6/18 |
| | | | | 60/806 |
| 2017/0138201 | A1* | 5/2017 | Takata | F01D 5/085 |
| 2017/0184015 | A1 | 6/2017 | Andren et al. | |
| 2018/0266333 | A1* | 9/2018 | Gassner | F02C 9/20 |
| 2020/0025379 | A1* | 1/2020 | Jones | F23R 3/06 |
| 2020/0158019 | A1* | 5/2020 | Kawai | F02C 7/224 |
| 2021/0348561 | A1* | 11/2021 | Cocks | F02C 7/12 |
| 2023/0175439 | A1* | 6/2023 | Kinoshita | F23R 3/005 |
| | | | | 60/806 |
| 2024/0410656 | A1* | 12/2024 | McCaffrey | F23R 3/005 |
| 2024/0418121 | A1* | 12/2024 | Smith | F02C 7/224 |

\* cited by examiner

SYSTEM AND METHOD FOR GENERATING ELECTRICITY AND HEAT FROM THE COMBUSTION OF TAIL GAS CONTAINING BIOGENIC METHANE USING A GAS TURBINE

RELATED APPLICATIONS

This application claims the benefit, and priority benefit, of U.S. Provisional Patent Application Ser. No. 63/624,559, filed Jan. 24, 2024, the disclosure and contents of which are incorporated by reference herein in their entireties.

BACKGROUND

Field of the Invention

The present disclosure relates to biogenic methane purification, and more specifically, to a system and method for the generation of electricity and heat from the combustion of tail gas containing biogenic methane from a biogenic methane purification process using a gas turbine.

Description of the Related Art

Industrial processes can utilize air pollution control devices to thermally destruct waste gas streams. Biogenic methane purification processes such as Renewable Natural Gas (RNG) plants utilize air pollution control devices as part of the purification of byproduct tails gases containing biogenic methane.

There are challenges and inefficiencies in these current biogenic methane purification processes.

Improvements in this field of technology are therefore desired.

SUMMARY

In accordance with the presently disclosed subject matter, various illustrative embodiments of a system and method for generating electricity and heat from the combustion of tail gas containing biogenic methane using a gas turbine are provided herein.

In certain illustrative embodiments, a system is provided that can include a gas turbine; and a generator operably connected to the gas turbine and configured to utilize mechanical energy produced by the gas turbine to generate electricity. The gas turbine can include a primary combustion chamber configured to combust a methane-rich natural gas with a combustion air stream, a primary cooling jacket configured to preheat the combustion air stream and to cool the primary combustion chamber with the combustion air stream prior to the combustion air stream entering the primary combustion chamber, a secondary combustion chamber configured to combust a tail gas supplied from the biogenic methane purification process, wherein the tail gas comprises biogenic methane, with a hot exhaust air stream from the primary combustion chamber, and a secondary cooling jacket configured to preheat the tail gas and cool the secondary combustion chamber with the tail gas prior to the tail gas entering the secondary combustion chamber. The methane-rich natural gas can be supplied from a biogenic methane purification process. The system can further include a tail gas compressor upstream of the gas turbine and configured to increase a pressure of the tail gas to an operating pressure of the secondary combustion chamber prior to introducing the tail gas into the secondary cooling jacket. The system can further include a turboexpander upstream of the gas turbine and configured to volumetrically expand the methane-rich natural gas and generate electricity prior to introducing the methane-rich natural gas into the primary combustion chamber. The tail gas can further include at least one of carbon dioxide, nitrogen, oxygen, water vapor, hydrogen, carbon monoxide, and non-methane organic compounds. The tail gas can have a heating value of at least 42 BTU/SCF. The gas turbine can further include an air compressor configured to increase a pressure of the combustion air stream prior to introducing the combustion air stream into the primary cooling jacket. The gas turbine can further include a clutch that connects the tail gas compressor to the air compressor. The clutch can be configured to disengage the tail gas compressor from the air compressor during startup of the primary combustion chamber. The clutch can be configured to engage the tail gas compressor when combustion of natural gas in the primary combustion chamber and flow of compressed air to the primary combustion chamber are both stabilized. The system can further include an electrical switchgear configured to receive the electricity generated from the generator and supply the electricity to a local power grid. The system can further include an electrical switchgear configured to receive the electricity generated from the generator and supply the electricity back to the biogenic methane purification process.

In certain illustrative embodiments, a method is provided. A methane-rich natural gas can be introduced into a gas turbine. The methane-rich natural gas can be combusted in the gas turbine to produce mechanical energy, wherein the methane-rich natural gas is combusted with a combustion air stream in a primary combustion chamber of the gas turbine. A tail gas can be introduced from the biogenic methane purification process into the gas turbine. The tail gas can include biogenic methane. The tail gas can be combusted in the gas turbine to produce mechanical energy, wherein the tail gas is combusted with a hot exhaust air stream from the primary combustion chamber in a secondary combustion chamber of the gas turbine. The combustion air stream can be introduced into a primary cooling jacket and the primary combustion chamber can be cooled with the primary cooling jacket prior to introducing the combustion air stream to the primary combustion chamber. The tail gas can be introduced into a secondary cooling jacket and the secondary combustion chamber can be cooled with the secondary cooling jacket prior to introducing the tail gas to the secondary combustion chamber. The mechanical energy from the gas turbine can be used to generate electricity. The methane-rich natural gas can be from a biogenic methane purification process. The methane-rich natural gas can be depressurized to volumetrically expand the methane-rich natural gas prior to introducing the methane-rich natural gas into the primary combustion chamber. The tail gas can be pressurized to an operating pressure of the secondary combustion chamber prior to introducing the tail gas to the secondary combustion chamber. The tail gas can further include at least one of carbon dioxide, nitrogen, oxygen, water vapor, hydrogen, carbon monoxide, and non-methane organic compounds. The electricity generated from the gas turbine can be supplied to a local power grid. The electricity generated from the gas turbine can be supplied back to the biogenic methane purification process.

BRIEF DESCRIPTION OF THE DRAWINGS

A better understanding of the presently disclosed subject matter can be obtained when the detailed description is considered in conjunction with the following drawings, wherein.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

The presently disclosed subject matter relates to a system and method for generating electricity and heat from the simultaneous combustion of natural gas and tail gases from biogenic methane purification processes.

Biogenic methane purification processes such as renewable natural gas (RNG) plants process gas containing biogenic methane. The biogenic methane may be sourced from a landfill or an anaerobic digester into renewable natural gas by removing fixed gases such as carbon dioxide, carbon monoxide, hydrogen, nitrogen, oxygen, and other trace contaminants.

However, biogenic methane purification processes do not fully recover the biogenic methane in feedstocks such as biogas, as the biogenic methane purification process typically slips a small amount of biogenic methane in waste gas streams. These waste gas streams may be sent to air pollution control devices, for example, a thermal oxidizer or a process flare, for thermal destruction. In such instances, the processes consume non-renewable natural gas in order to continuously operate the air pollution control devices to achieve the proper destruction temperature. Conventional operation of these air pollution control devices does not achieve full destruction of the biogenic methane in the tail gases. The non-renewable natural gas may incinerate the tail gases containing the biogenic methane without any form of energy recovery. A small amount of biogenic methane may also be emitted to the atmosphere.

Moreover, some biogenic methane purification processes such as RNG plants also consume significant amounts of electricity and other forms of energy. Therefore, these types of plants are potentially burdened by significant operating costs. The carbon dioxide emissions associated with flaring and grid-sourced electricity may have a negative effect on credit revenue where purified biomethane is marketed and sold based on reduction of carbon intensity of transportation fuels, as more carbon intensive methods of producing renewable transportation fuels such as renewable natural gas earn less credit revenue per unit of energy.

The system and method of the presently disclosed subject matter overcome at least a portion of the challenges of biogenic methane purification processes. The system and method disclosed herein relate to generating electricity and heat from the combustion of natural gas and tail gases from biogenic methane purification processes. A gas turbine can generate electricity and heat from process tail gases (comprising biomethane, but also comprising fixed gases such as carbon dioxide, nitrogen, oxygen, hydrogen, carbon monoxide, as well as trace gases) as a secondary fuel while using natural gas as the primary fuel in the gas turbine. The tail gases from biogenic methane purification processes can have heating values as low as 42 BTU/SCF. The gas turbine can reduce net energy consumption, reduce greenhouse gas emissions, and reduce operating costs for biogenic methane purification processes. The gas turbine can also destroy tail gases that would otherwise cause excessive air emissions without the use of pollution control equipment (such as a thermal oxidizer or flare). The gas turbine can achieve a destruction efficiency greater than that of pollution control equipment by combusting virtually all the methane in the tail gases and natural gas, as gas turbines typically have a much lower methane slip than pollution control equipment.

In general, gas turbines can be powered by biogas, natural gas, or industrial waste gases such as refinery offgas, syngas, blast furnace gas, or coal mine methane. The system and method disclosed herein utilize tail gases specifically from biogenic methane purification processes. The systems and methods described herein can utilize a combination of: (i) tail gases from biomethane purification processes; and (ii) natural gas, sourced from either a pipeline or from a biogenic methane purification process, as the fuel used to power the gas turbine. The presently disclosed system and method can supplement or replace electricity consumed by a biogenic methane purification process. This practice serves as the replacement of the standard practice of using natural gas to incinerate said tail gases without any form of energy recovery.

Most biogenic methane purification processes do not fully recover the thermal energy of the methane, and these plants/processes consume significant amounts of electricity and energy, which is often the largest operating expense for those processes. The presently disclosed system and method can allow these biogenic methane purification processes to utilize the thermal energy from waste gases and natural gas consumed by the plants and reduce operating expenses in these biogenic methane purification processes.

Figure 1:
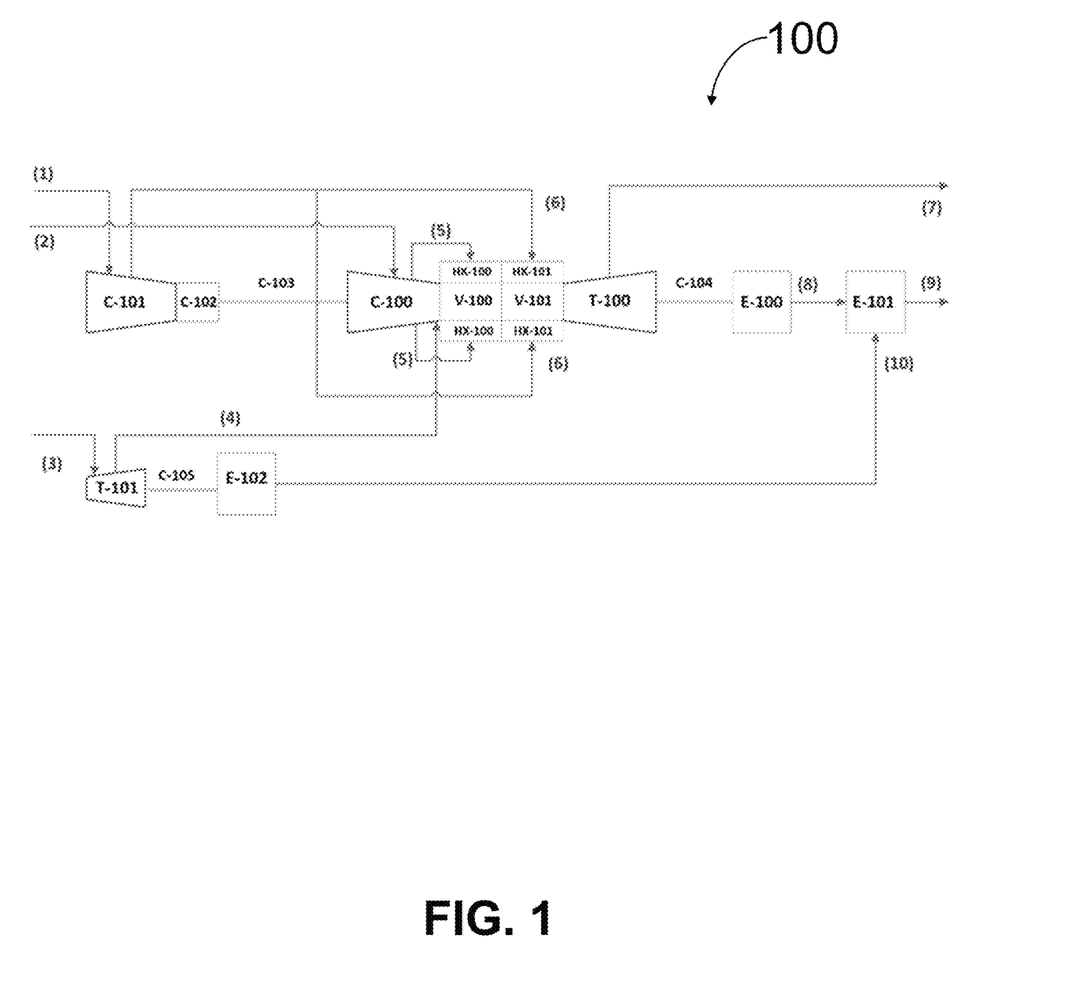
FIG. 1 is a schematic diagram of a system for combustion of tail gases from biogenic methane purification processes and natural gas in a gas turbine, in accordance with an illustrative embodiment of the presently disclosed subject matter.

FIG. 1 is a schematic diagram of a system 100 for combustion of tail gases from biogenic methane purification processes and natural gas in a gas turbine, according to certain illustrative embodiments.

As shown in Table 1 and Table 2 below, the system 100 can include a gas turbine T-100 and related equipment that utilize thermal energy from waste gases and natural gas from the biomethane purification processes consumed by the RNG plants to power the gas turbine T-100.

TABLE 1

| Stream No. | Process Stream Description |
|---|---|
| 1 | Tail Gas from Biogenic Methane Purification Process |
| 2 | Combustion Air to Gas Turbine Compressor |
| 3 | Supplemental Fuel Gas to Turboexpander or Gas Turbine Compressor |
| 4 | Expanded or Compressed Natural Gas to Primary Combustion Chamber |
| 5 | Compressed Combustion Air to Primary Cooling Jacket |
| 6 | Compressed Tail Gas to Secondary Cooling Jacket |
| 7 | Exhaust Gases from Gas Turbine |
| 8 | Turbine Electricity from Gas Turbine Electrical Generator to Electrical Switchgear |

TABLE 1-continued

| Stream No. | Process Stream Description |
|---|---|
| 9 | Electricity From Electrical Switchgear to End User |
| 10 | Turboexpander Electricity from Turbo Expander Electrical Generator |

TABLE 2

| Equipment No. | Equipment Description |
|---|---|
| C-100 | Gas Turbine Compressor |
| C-101 | Tail Gas Compressor |
| C-102 | Tail Gas Compressor Clutch |
| C-103 | Gas Turbine Compressor - Tail Gas Turbine Clutch Shaft |
| C-104 | Gas Turbine- Gas Turbine Electrical Generator Shaft |
| C-105 | Turboexpander - Turboexpander Electrical Generator Shaft |
| E-100 | Gas Turbine Electrical Generator |
| E-101 | Electrical Switch Gear |
| E-102 | Turboexpander Electrical Generator |
| HX-100 | Primary Cooling Jacket |
| HX-101 | Secondary Cooling Jacket |
| T-100 | Gas Turbine |
| T-101 | Turboexpander |
| V-100 | Primary Combustion Chamber |
| V-101 | Secondary Combustion Chamber |

FIG. 1 shows an illustrative embodiment of system 100 wherein a tail gas (1) can be introduced into system 100 from a biogenic methane purification process. The tail gas (1) can be comprised mostly of carbon dioxide, as well as small amounts of biogenic methane, nitrogen, oxygen, hydrogen, carbon monoxide, water vapor, and some trace contaminants. The tail gas (1) can be combusted with natural gas (3), sourced either from a natural gas pipeline that interconnects with the biogenic methane purification plant or from the product gas produced by the biogenic methane purification plant. Both gases (1) and (3) are fed to the gas turbine T-100, where the natural gas (3) is combusted inside the turbine's primary combustion chamber V-100 and the tail gas (1) is combusted inside of the turbine's secondary combustion chamber V-101. The resulting mechanical energy from the combustion is used to spin a generator E-100, thereby generating electricity.

In certain illustrative embodiments, the hot exhaust gas (7) exiting the gas turbine T-100 is typically routed through a stack to the atmosphere, but the hot exhaust gas (7) can optionally be used for additional electricity generation via a steam turbine system, wastewater evaporation, thermal energy for carbon capture processes, district heating or cooling, or another miscellaneous process heat applications.

In certain illustrative embodiments, natural gas (3), either sourced from a local pipeline or from the product gas produced by the biogenic methane purification process, is introduced into the system 100 by injecting the natural gas (3) into the primary combustion chamber V-100 of the gas turbine T-100. Optionally, as shown in FIG. 1, the natural gas (3) can be first routed to a turboexpander T-101 to recovery energy from depressurization of the natural gas (3) and generate electricity from the turboexpander T-101 via turboexpander electrical generator E-102. After being optionally routed to the turboexpander T-101, the expanded natural gas (4) is injected into the primary combustion chamber V-100 of the gas turbine T-100.

In certain illustrative embodiments, the primary combustion chamber V-100 can be equipped with electrical ignitors to start the combustion reaction between compressed air (5) and natural gas (4).

In certain illustrative embodiments, tail gas (1) from the biogenic methane purification process is introduced into the system 100 by routing the tail gas (1) to a tail gas compressor C-101, which raises the pressure of the tail gas (1) to produce a compressed tail gas (6) to match the operating pressure of the secondary combustion chamber V-101 in the gas turbine T-100. The compressed tail gas (6) is subsequently sent to the secondary cooling jacket HX-101 of the gas turbine T-100, thereby preheating the compressed tail gas (6) and cooling the walls of the secondary combustion chamber V-101. The compressed tail gas (6) is finally injected into the secondary combustion chamber V-101 to combust the biogenic methane in the tail gas (6) and provide additional thermal energy for the gas turbine T-100.

The destruction efficiency of the biogenic methane in the gas turbine T-100 would be higher than that of a typical air pollution control device, such as a thermal oxidizer, used in a biogenic methane purification process. This represents a significant improvement upon current practices. Additionally, the heat recovery from the tail gas (1) for additional electricity generation is also a significant improvement upon current practices.

In certain illustrative embodiments, the secondary combustion chamber V-101 can be equipped with electrically powered ignitors to start the combustion reaction between the compressed tail gas (6) and the air contained in the hot exhaust products exiting the primary combustion chamber V-100.

In certain illustrative embodiments, the tail gas compressor C-101 is connected to one or more air compressor blades of the gas turbine T-100 via a rotating shaft C-103 and a clutch C-102. During startup of the primary combustion chamber V-100, the clutch C-102 disengages the tail gas compressor C-101 from the air compressor blades. Once combustion of natural gas (4) in the primary combustion chamber V-100 and flow of compressed air (5) to the primary combustion chamber V-100 are both stabilized, the clutch C-102 is engaged and activates the tail gas compressor C-101, thereby introducing compressed tail gases (6) into the secondary combustion chamber V-101.

In certain illustrative embodiments, two cooling jackets HX-100 and HX-101 are used. A primary cooling jacket HX-100 is used to preheat compressed combustion air (5) entering the primary combustion chamber V-100 of the gas turbine T-100 and to keep the materials of the primary combustion chamber V-100 from overheating and exceeding operational temperature limits. A secondary cooling jacket HX-101 is used to preheat the tail gases (6) entering the secondary combustion chamber V-101 of the gas turbine T-100 and to keep the materials of the secondary combustion chamber V-101 from overheating and exceeding operational temperature limits.

In certain illustrative embodiments, electricity generated from the gas turbine T-100 is transmitted from a generator E-100 to an electrical switchgear E-101 for distribution and utilization. Optionally, electricity generated from the natural gas turboexpander T-101 is also transmitted from a turboexpander generator E-102 to the electrical switchgear E-101 for distribution and utilization. The electricity transmitted from the electrical switchgear E-101 either is supplied back to the biogenic methane purification process or to another electricity end-user.

In certain illustrative embodiments, the electrical switchgear E-101 can supply auxiliary electricity from the local power grid or another electricity source during startup of the gas turbine T-100. The electrical switchgear E-101 includes analytical and measurement equipment that measures electricity produced, electricity consumed from the grid, electrical voltage, electrical frequency, tail gas composition, tail gas flowrate, natural gas heating value, natural gas flowrate, energy totalizers, and other analytical equipment related to the measures of key variables related to tail gas, natural gas, electricity, heat, and energy associated with the gas turbine T-100.

Figure 2:
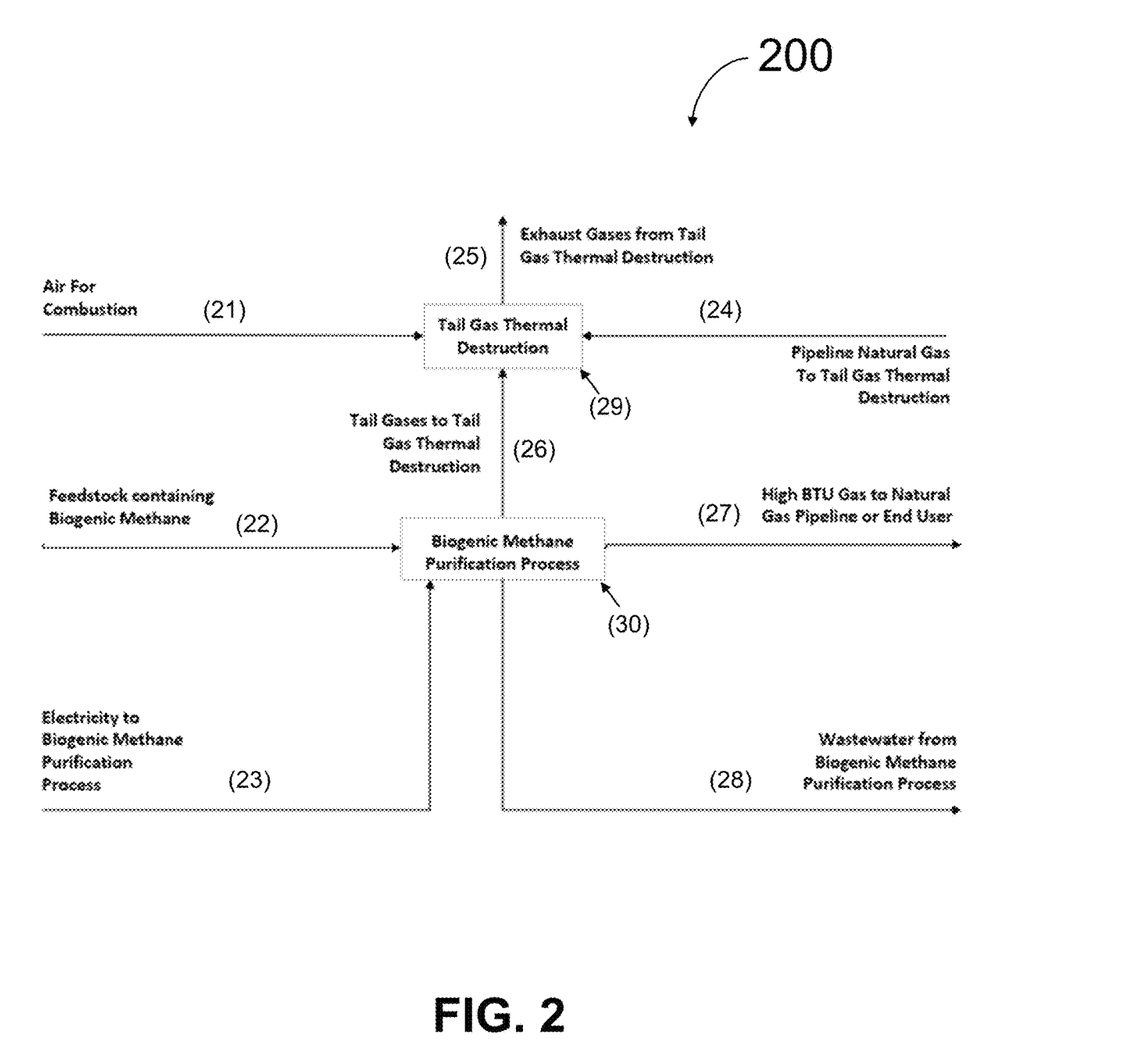
FIG. 2 is a block diagram of a conventional operation of a biogenic methane purification process.

FIG. 2 is a block diagram of a conventional operation 200 of a biogenic methane purification process. At block 30, the biogenic methane purification process, such as a RNG plant, processes a feedstock stream (22) containing biogenic methane. The biogenic methane purification process receives electricity from an electricity stream (23) to power the biogenic methane purification process. The biogenic methane purification process removes fixed gases such as carbon dioxide, carbon monoxide, hydrogen, nitrogen, oxygen, and other trace contaminants. Gas having a BTU content greater than the feedstock gas flows to a natural gas pipeline or another end user in a natural gas end user stream (27). Wastewater from the biogenic methane purification process is removed from the biogenic methane purification process in a wastewater stream (28). A portion of the biogenic methane is not recovered and flows to an air pollution control device as a tail gas in a tail gas stream (26) for thermal destruction at block 29, the tail gas thermal destruction. Thermal destruction may be performed using a thermal oxidizer or a process flare. Non-renewable natural gas in a pipeline natural gas stream (24) is used to continuously operate air pollution control device. Air is provided in an air combustion stream (21) to combust the tail gas. The air pollution control device achieves the proper destruction temperature to destruct the biogenic methane in the tail gas. Despite achieving the proper destruction temperature, the air pollution control devices does not fully destruct the biogenic methane in the tail gases. The non-combusted biogenic methane is emitted to the atmosphere as an exhaust gas in an exhaust gas stream (25).

Figure 3:
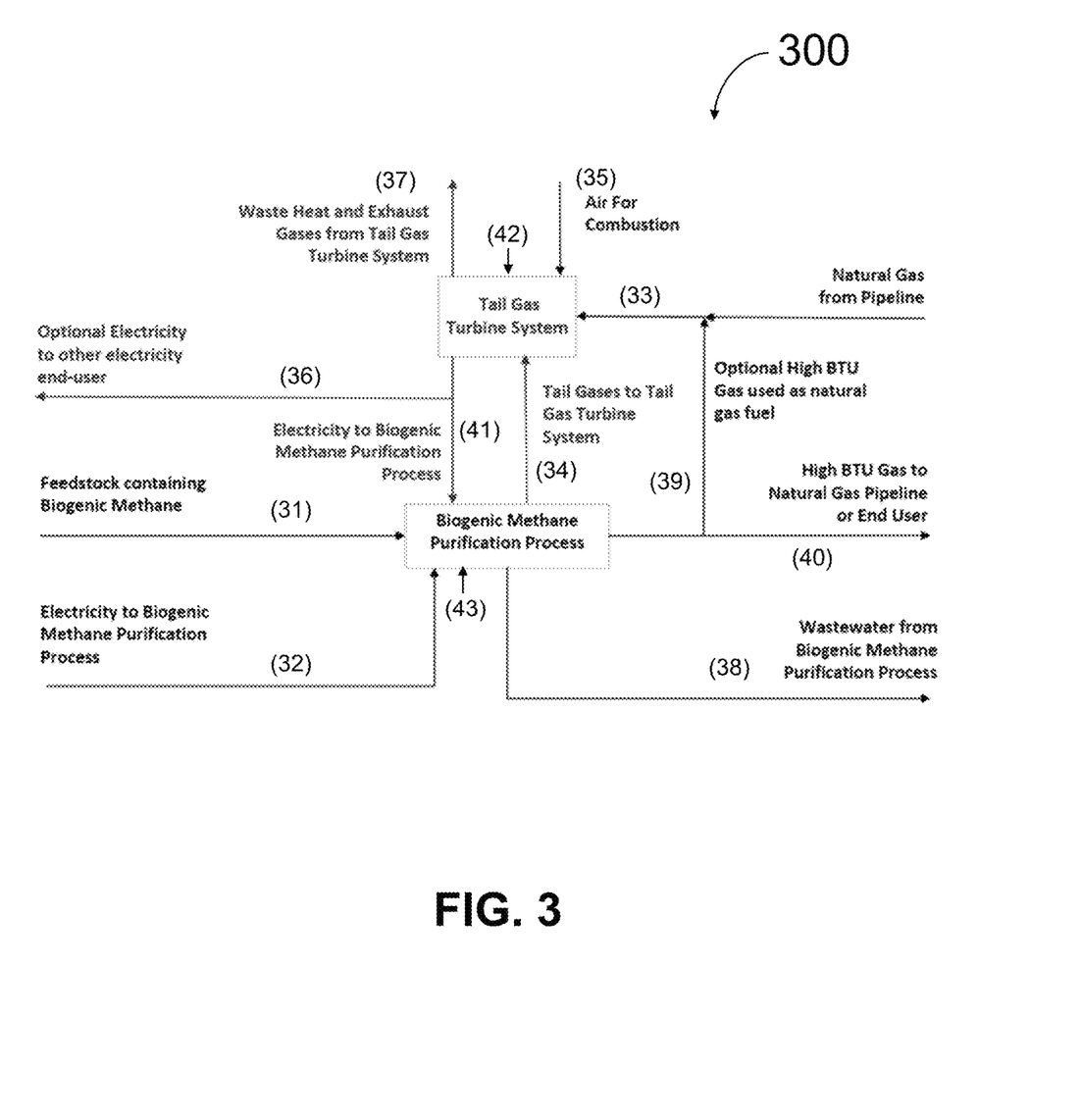
FIG. 3 is a block diagram of a gas turbine, in accordance with an illustrative embodiment of the presently disclosed subject matter.

By comparison, FIG. 3 is a block diagram of an improved process 300, according to certain illustrative embodiments. As presently disclosed, a gas turbine is utilized to generate electricity and heat from the tail gas as a secondary fuel and the natural gas as a primary fuel in the gas turbine. At block (43), the biogenic methane purification process, such as a RNG plant, processes a feedstock stream (31) containing biogenic methane. The biogenic methane purification process receives electricity from an electricity stream (32) to power the biogenic methane purification process.

However, distinguishable from FIG. 2, the biogenic methane purification process at block (43) of FIG. 3 also receives electricity from the tail gas turbine system in a turbine electricity stream (41) to power the biogenic methane purification process (43). The electricity received from the tail gas turbine system, at block (42), is the primary source of electricity for the biogenic methane purification process, at block (43). The biogenic methane purification process utilizes the electricity primarily received from the tail gas turbine system, to remove fixed gases such as carbon dioxide, carbon monoxide, hydrogen, nitrogen, oxygen, and other trace contaminants. Gas having BTU content greater than the feedstock gas flows to a natural gas pipeline or another end user in a natural gas end user stream (40). The gas having a BTU content greater than the feedstock gas may be used as a natural gas fuel, or fuel gas for the tail gas turbine system, at block (42). Wastewater from the biogenic methane purification process is removed from the biogenic methane purification process in a wastewater stream (38). The tail gas generated from the biogenic methane purification process, in a tail gas stream (34), is utilized as a secondary fuel to generate the electricity for the biogenic methane purification process, at block (42). Natural gas in a pipeline natural gas stream (33) is used as a primary fuel for the tail gas turbine system, at block (42). Air is provided in an air combustion stream (35) to combust the tail gas. A portion of the electricity generated from the tail gas turbine system, at block (42), may be used for electricity to other end users, in an end-user stream (36). The non-combusted biogenic methane is emitted to the atmosphere as an exhaust gas in an exhaust gas stream (37). In some embodiments, the gas turbine has a reduced methane gas slip compared to a pollution control equipment. In some embodiments, the biogenic methane is not combusted.

Figure 4:
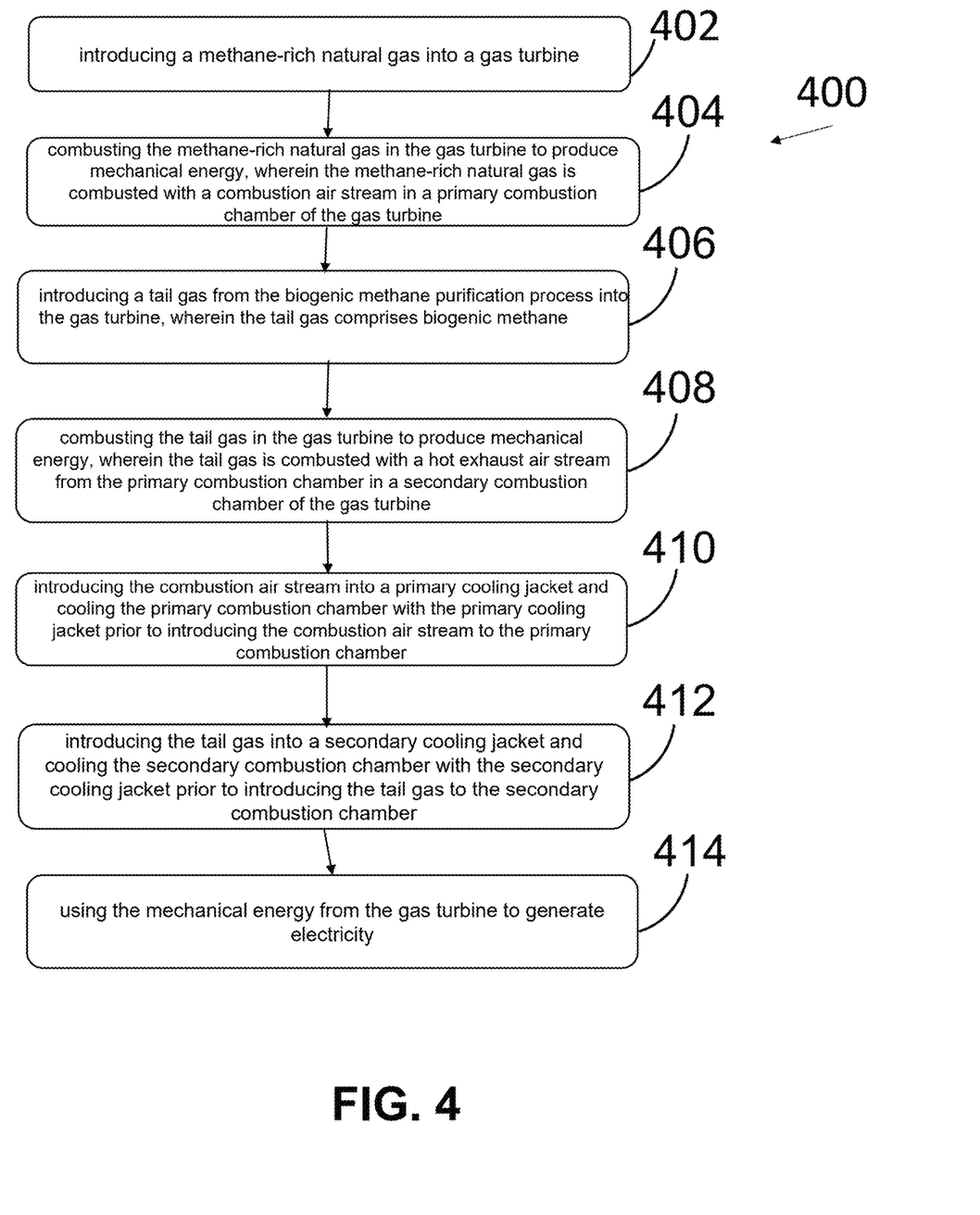
FIG. 4 is a flow diagram of a method for generating electricity and heat from the combustion of natural gas and tail gases from biogenic methane purification processes in a gas turbine, in accordance with an illustrative embodiment of the presently disclosed subject matter.

FIG. 4 is a flow diagram of a method 400 for generating electricity and heat from the combustion of natural gas and tail gases from biogenic methane purification processes in a gas turbine, according to certain illustrative embodiments. As shown in FIG. 4, the method includes the steps of: introducing a methane-rich natural gas into a gas turbine (402); combusting the methane-rich natural gas in the gas turbine to produce mechanical energy, wherein the methane-rich natural gas is combusted with a combustion air stream in a primary combustion chamber of the gas turbine (404); introducing a tail gas from the biogenic methane purification process into the gas turbine, wherein the tail gas comprises biogenic methane (406); combusting the tail gas in the gas turbine to produce mechanical energy, wherein the tail gas is combusted with a hot exhaust air stream from the primary combustion chamber in a secondary combustion chamber of the gas turbine (408); introducing the combustion air stream into a primary cooling jacket and cooling the primary combustion chamber with the primary cooling jacket prior to introducing the combustion air stream to the primary combustion chamber (410); introducing the tail gas into a secondary cooling jacket and cooling the secondary combustion chamber with the secondary cooling jacket prior to introducing the tail gas to the secondary combustion chamber (412); and using the mechanical energy from the gas turbine to generate electricity (414).

At step 402, the method 400 comprises introducing a methane-rich natural gas into a gas turbine. In some embodiments, a natural gas source may be obtained from a pipeline. In some embodiments, a natural gas source may be obtained from a biogenic methane purification process. In some embodiments, the natural gas source comprises a methane-rich natural gas from at least one of a pipeline, a biomethane purification process, or any combination thereof.

At step 406, the method 400 comprises introducing a tail gas from the biogenic methane purification process into the gas turbine, wherein the tail gas comprises biogenic methane. In some embodiments, the tail gas source is obtained from a biomethane purification process. In some embodiments, the tail gas source comprises a tail gas. In some embodiments, the tail gas comprises at least one of a carbon dioxide, a biogenic methane, a nitrogen, an oxygen, a water vapor, a hydrogen, a carbon monoxide, a non-methane organic compounds, or any combination thereof.

In certain illustrative embodiments, the methane-rich natural gas can be from a biogenic methane purification process. The methane-rich natural gas can be depressurized to volumetrically expand the methane-rich natural gas prior to introducing the methane-rich natural gas into the primary combustion chamber. The tail gas can be pressurized to an operating pressure of the secondary combustion chamber prior to introducing the tail gas to the secondary combustion chamber. The electricity generated from the gas turbine can be supplied to a local power grid. The electricity generated from the gas turbine can be supplied back to the biogenic methane purification process.

The presently disclosed system and method advantageously utilize thermal energy from tail gases that would have been otherwise unused due to the current practice of tail gas incineration associated with biogenic methane purification processes, and the lower carbon intensity of biomethane production due to lower consumption of grid electricity which often sources electricity from fossil fuel fired power plants.

It is to be understood that the described subject matter is not limited to the exact details of construction, operation, exact materials, or illustrative embodiments shown and described, as modifications and equivalents will be apparent to one skilled in the art. Accordingly, the subject matter is therefore to be limited only by the scope of the appended claims.

What is claimed is:

1. A system comprising:
   a gas turbine; and
   a generator operably connected to the gas turbine and configured to utilize mechanical energy produced by the gas turbine to generate electricity,
   wherein the gas turbine comprises:
   a primary combustion chamber configured to combust a methane-rich natural gas with a combustion air stream,
   a primary cooling jacket configured to preheat the combustion air stream and to cool the primary combustion chamber with the combustion air stream prior to the combustion air stream entering the primary combustion chamber,
   a secondary combustion chamber configured to combust a tail gas supplied from a biogenic methane purification process, wherein the tail gas comprises biogenic methane, with a hot exhaust air stream from the primary combustion chamber, and
   a secondary cooling jacket configured to preheat the tail gas and cool the secondary combustion chamber with the tail gas prior to the tail gas entering the secondary combustion chamber.

2. The system of claim 1, wherein the methane-rich natural gas is supplied from the biogenic methane purification process.

3. The system of claim 1, further comprising a tail gas compressor upstream of the gas turbine and configured to increase a pressure of the tail gas to an operating pressure of the secondary combustion chamber prior to introducing the tail gas into the secondary cooling jacket.

4. The system of claim 1, further comprising a turboexpander upstream of the gas turbine and configured to volumetrically expand the methane-rich natural gas and generate electricity prior to introducing the methane-rich natural gas into the primary combustion chamber.

5. The system of claim 1, wherein the tail gas further comprises at least one of carbon dioxide, nitrogen, oxygen, water vapor, hydrogen, carbon monoxide, and non-methane organic compounds.

6. The system of claim 1, wherein the tail gas has a heating value of at least 42 BTU/SCF.

7. The system of claim 1, wherein the gas turbine further comprises an air compressor configured to increase a pressure of the combustion air stream prior to introducing the combustion air stream into the primary cooling jacket.

8. The system of claim 7, wherein the gas turbine further comprises a clutch that connects the tail gas compressor to the air compressor.

9. The system of claim 7, wherein the clutch is configured to disengage the tail gas compressor from the air compressor during startup of the primary combustion chamber.

10. The system of claim 8, wherein the clutch is configured to engage the tail gas compressor when combustion of natural gas in the primary combustion chamber and flow of compressed air to the primary combustion chamber are both stabilized.

11. The system of claim 1, further comprising an electrical switchgear configured to receive the electricity generated from the generator and supply the electricity to a local power grid.

12. The system of claim 1, further comprising an electrical switchgear configured to receive the electricity generated from the generator and supply the electricity back to the biogenic methane purification process.

13. A method comprising:
    introducing a methane-rich natural gas into a gas turbine;
    combusting the methane-rich natural gas in the gas turbine to produce mechanical energy, wherein the methane-rich natural gas is combusted with a combustion air stream in a primary combustion chamber of the gas turbine;
    introducing a tail gas from a biogenic methane purification process into the gas turbine, wherein the tail gas comprises biogenic methane;
    combusting the tail gas in the gas turbine to produce mechanical energy, wherein the tail gas is combusted with a hot exhaust air stream from the primary combustion chamber in a secondary combustion chamber of the gas turbine;
    introducing the combustion air stream into a primary cooling jacket and cooling the primary combustion chamber with the primary cooling jacket prior to introducing the combustion air stream to the primary combustion chamber;
    introducing the tail gas into a secondary cooling jacket and cooling the secondary combustion chamber with the secondary cooling jacket prior to introducing the tail gas to the secondary combustion chamber; and
    using the mechanical energy from the gas turbine to generate electricity.

14. The method of claim 13, wherein the methane-rich natural gas is from the biogenic methane purification process.

15. The method of claim 13, further comprising depressurizing the methane-rich natural gas to volumetrically expand the methane-rich natural gas prior to introducing the methane-rich natural gas into the primary combustion chamber.

16. The method of claim 13, further comprising pressurizing the tail gas to an operating pressure of the secondary combustion chamber prior to introducing the tail gas to the secondary combustion chamber.

17. The method of claim 13, wherein the tail gas further comprises at least one of carbon dioxide, nitrogen, oxygen, water vapor, hydrogen, carbon monoxide, and non-methane organic compounds.

18. The method of claim 13, further comprising the supplying of the electricity generated from the gas turbine to a local power grid.

19. The method of claim 13, further comprising the supplying of the electricity generated from the gas turbine back to the biogenic methane purification process.

\* \* \* \* \*